United States Patent [19]

Kobane, Jr.

[11] 4,067,564
[45] Jan. 10, 1978

[54] WORK SUPPORTING JACK
[75] Inventor: John Kobane, Jr., Livonia, Mich.
[73] Assignee: F. Jos. Lamb Company, Warren, Mich.
[21] Appl. No.: 801,101
[22] Filed: May 27, 1977
[51] Int. Cl.² .............................................. B23Q 3/02
[52] U.S. Cl. ....................................... 269/310; 279/74
[58] Field of Search ...................... 269/296, 309–310; 254/104; 248/411, 412; 279/74

[56] References Cited
U.S. PATENT DOCUMENTS

| 3,792,855 | 2/1974 | Bondie | 269/310 |
| 3,858,867 | 1/1975 | Claycomb | 269/310 |

Primary Examiner—Robert C. Watson
Attorney, Agent, or Firm—Barnes, Kisselle, Raisch & Choate

[57] ABSTRACT

A work supporting plunger and a control plunger are perpendicularly arranged for axial sliding movement in a work support body. The inner end of the work support plunger engages an axially inclined face on the control plunger so that axial movement of the control plunger results in movement of the work support plunger to and from supporting engagement with a workpiece. A collet in the work support body concentric with the control plunger is adapted to lock the control plunger against movement. The collet is in turn surrounded by a collet locking sleeve movable axially to lock and release the collet.

19 Claims, 5 Drawing Figures

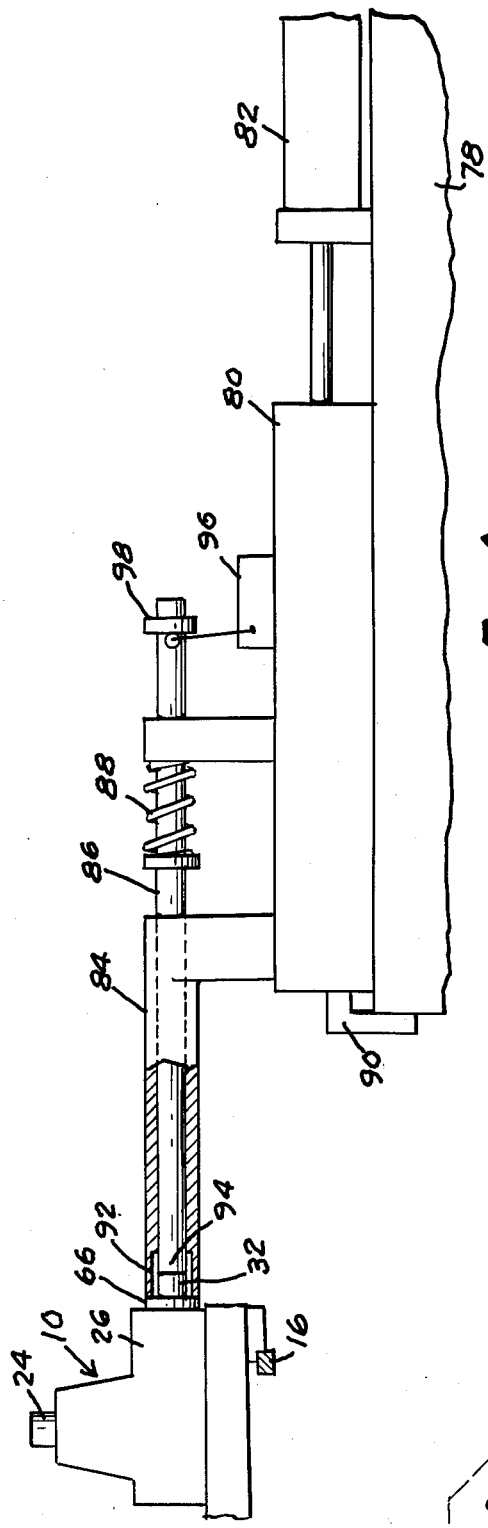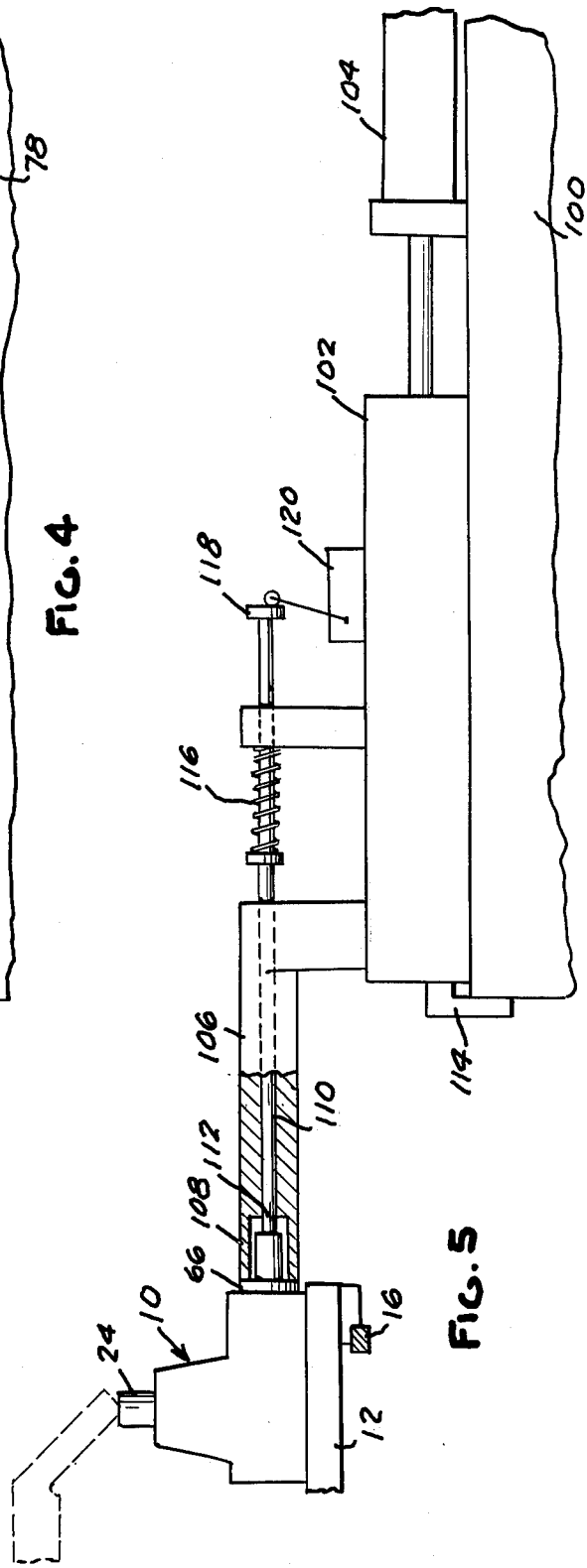

WORK SUPPORTING JACK

This invention relates to a jack for supporting and stabilizing a workpiece in a holding fixture while machining processes are being performed on the workpiece.

While being machined, workpieces are frequently retained in a holding fixture by resting the workpiece on two or more spaced apart pads on which the workpiece is clamped. The work pads on the holding fixture are usually small in area in order to facilitate cleaning of their operative faces and also to minimize the contact area of the locating surface on the workpiece. This reduces to a minimum the distortion resulting from possibly non-planar locating surfaces on the workpiece. However, with such an arrangement relatively large portions of the workpiece are unsupported and subject to deflection by the forces created during the machining operation. It is desirable to stabilize these unsupported portions by suitable means. When these unsupported portions are of irregular contour their locating positions are not readily predetermined and, therefore, a fixed height support cannot be used. Each successive workpiece may require a different height of supporting device. Another requirement is that, regardless of the device used to support the workpiece, it must not exert an excessive amount of initial contacting force on the workpiece. If the supporting device bears against the workpiece with excessive force, the workpiece will distort from its normal configuration and the machining operation will be performed under this abnormal condition. Thereafter, when the finished workpiece is removed from the work-holding fixture, it will return to its normal shape and the machined portion will not conform to the desired configuration and size.

A variety of devices have been used in the past to solve the above-mentioned problems, but none has been completely satisfactory for various reasons. Such devices have usually employed some force producing means (such as a wedge and a spring) for actuating a support member into contact with the workpiece. If the force producing means exerts too much pressure it will cause the support member to exert an excessive force on and distort the workpiece.

Another reason that some of the previously employed work-supporting devices have not been satisfactory resides in the fact that frequently during machining the workpiece has generated within it from the action of the cutting tool vibrations which at least momentarily separate the workpiece from the support member. For example, a resiliently loaded wedge will cause the support member actuated by the wedge to follow the displaced surface of the workpiece and will not allow it to return. This distorts the workpiece from its true shape and will continue during successive pulsations until the workpiece resists such further distortion. This is particularly true when the natural frequency of the clamped workpiece matches the frequency generated by the cutting elements of a rotating cutting tool.

It is an object of this invention to overcome the disadvantages referred to above by providing a workpiece supporting jack that is self-locating without applying forces to the workpiece of a sufficient magnitude to distort it.

It is another object of this invention to positively lock the work supporting member of the jack against further movement in any direction after its initial exact location.

Another object of the invention resides in the provision of a work supporting jack which is of relatively simple design, economical construction, and reliable in operation.

Other objects, features and advantages of the present invention will become apparent from the following description and accompanying drawings, in which:

FIG. 4 is a fragmentary diagrammatic view, partly in section, showing a work support release mechanism; and FIG. 5 is a fragmentary diagrammatic view, partly in section, showing a work support setting mechanism.

Figure 1:
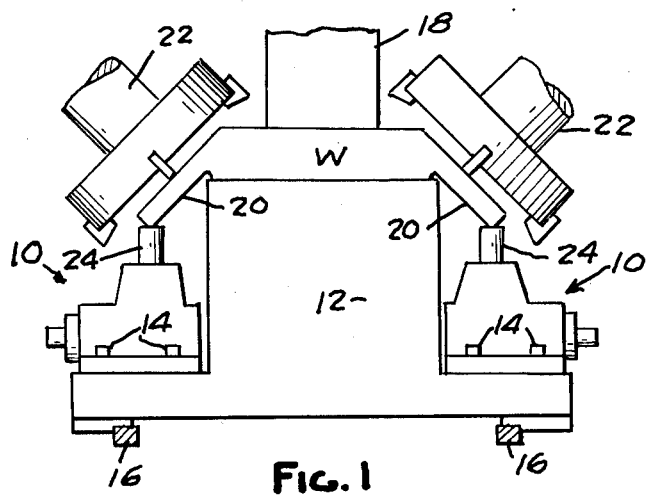
FIG. 1 is a diagrammatic end elevational view of a work holding fixture which incorporates work supporting jacks of the present invention.
Figure 3:
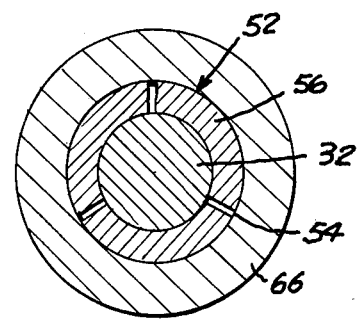
FIG. 3 is a sectional view taken along the line 3—3 in FIG. 2.

A typical application for work supporting jacks according to the present invention is shown in FIG. 1 wherein the jacks 10 are mounted on a work holding fixture 12 by means of screws 14. Work holding fixture 12 can be permanently mounted at a machining station or can be in the form of a pallet which is transferred to successive machining stations on a pair of rails 16. The workpiece W is adapted to be supported by fixture 12 and firmly secured thereto by the force of one or more clamps 18. In the arrangement illustrated workpiece W has extensions 20 the upper faces of which are arranged to be machined by milling cutters 22. The lower ends of extensions 20 are supported by plungers 24 of the work supports 10. The internal construction of work supports 10 is such that plungers 24 are locked in a fixed vertical position to resist any forces applied to extensions 20 by milling cutters 22.

Figure 2:
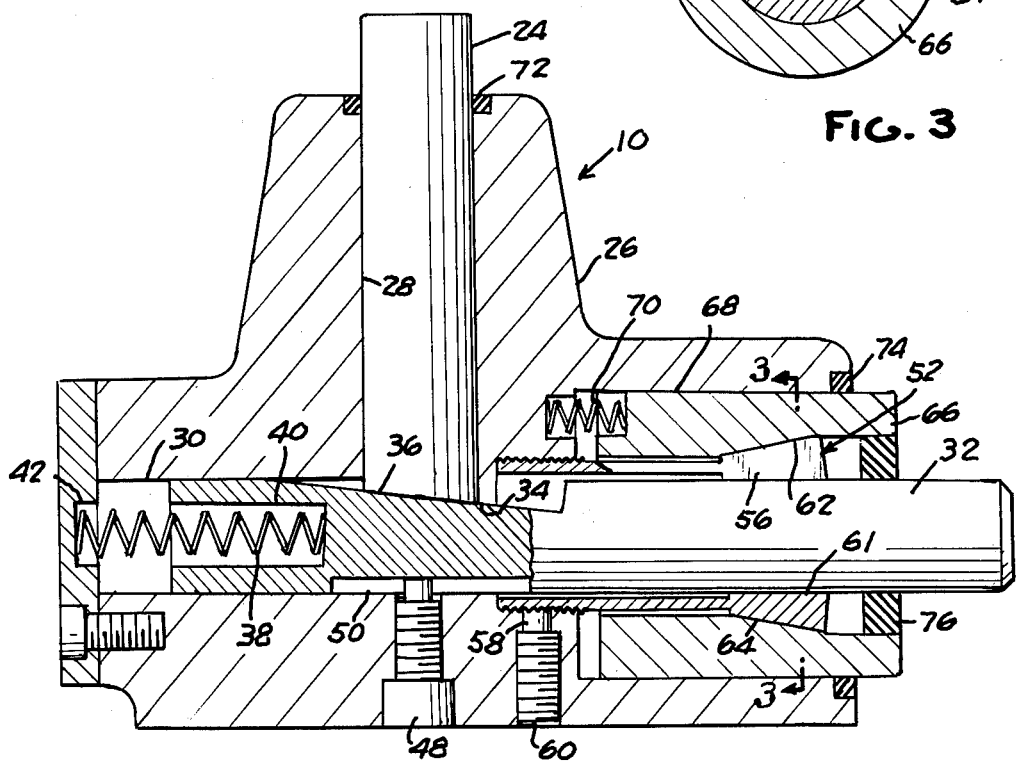
FIG. 2 is a vertical sectional view of a work supporting jack according to the present invention.

Referring now to FIG. 2, each work support 10 comprises a body 26, preferably in the form of a casting, having a vertical bore 28 which intersects a horizontal bore 30. Work support plunger 24 is slideably arranged in bore 28 and its upper end normally projects upwardly beyond body 26. The inner end of plunger 24 engages a control plunger 32 slideably arranged in bore 30. Plunger 32 is formed with an inclined wedge face 34 on which the similarly inclined inner end face 36 of plunger 24 is supported. When plunger 32 moves in a direction toward the right work support plunger 24 is displaced upwardly and when plunger 32 is moved in a direction toward the left plunger 24 is free to shift downwardly in body 26.

Control plunger 32 is biased in a direction toward the right by means of a spring 38. One end of spring 38 is seated in a blind hole 40 at the inner edge of plunger 32. The opposite end of spring 38 is seated in a shallow bore 42 formed in a cover plate 44 mounted on body 26 by screws 46. Plunger 32 is prevented from rotating within bore 30 by the reduced end of a screw 48 engaged within an axially extending keyway 50 on plunger 32.

The outer end portion of plunger 32 is surrounded by a concentric collet sleeve 52. Collet sleeve 52 is of conventional construction. It is axially slotted around its circumference at one end thereof as at 54 to divide that end of the collet into a plurality of spring fingers or segments 56. The other end of collet sleeve 52 is threaded into body 26 and secured against axial displacement therein by means of a soft plug 58 which is forced against the threads of the collet sleeve by means of a screw 60. The free end portions of spring fingers 56 are internally circle ground as at 61 so as to have a close sliding fit with the outer surface of control plunger 32. The outer surfaces of these spring fingers are taper ground as at 62 for mating engagement with an internally ground similarly tapered surface 64 on a collet actuating sleeve 66. Sleeve 66 is slideably supported in a bore 68 which is accurately concentric with the longitudinal axis of bore 30. Sleeve 66 is biased in an axially outwardly direction by a plurality of springs 70. The tension of springs 70 is sufficient to cause the tapered surface 64 of sleeve 66 to urge the spring fingers 56 into tight clamping engagement with the outer surface of control plunger 32 to thereby lock the latter against axial movement in bore 30. It will be observed that, since collet sleeve 52 is axially fixed in body 26, when the collet closes around control plunger 32 it produces no forces which would tend to displace the control plunger axially. The clamping force exerted by the collet sleeve on the control plunger depends upon the number and strength of springs 70, the angle of inclination of surfaces 62,64, and the number of individual segments or spring fingers 56. Preferably the surfaces 62,64 are inclined to the axis of bore 30 at a wedge locking angle. Normally control plunger 32, collet actuating sleeve 66 and work supporting plunger 24 project axially outwardly of body 26. Resilient elastomeric seals 72,74,76 are provided to seal against contaminants in the sliding fit of plunger 24, sleeve 66 and plunger 32.

After the workpiece W has been machined it may be unclamped and removed from fixture 12 without regard to jacks 10. However, before another workpiece is placed and clamped on the fixture, control plunger 32 must be released in order to permit work support plunger 24 to retract at least slightly either by way of gravity or by the placement of another workpiece on the fixture. A unique mechanism for releasing plunger 32 to allow retraction of plunger 24 is shown in FIG. 4. The release mechanism includes a base 78 which supports a slide 80 actuated in a rectilinear path by a cylinder 82. A tubular sleeve 84 is fixedly mounted on slide 80 in axial alignment with collet actuating sleeve 66. Within sleeve 84 there is slideably arranged a rod 86. Rod 86 is biased in a direction toward the left as shown in FIG. 4 by a spring 88. Slide 80 is arranged on base 78 such that when cylinder 82 is actuated slide 80 shifts to the left against a stop 90, at which point free end 92 of sleeve 84 engages the projecting end of collet actuating sleeve 66 and displaces it inwardly of body 26 against the bias of springs 70 to thereby release the collet. As soon as the collet is released the outer end 94 of rod 86 is biased by spring 88 to shift plunger 32 axially inwardly of body 26. Spring 88 is a stronger spring than spring 38 which biases control plunger 32 in a direction outwardly of body 26. Thus, when slide 80 engages stop 90 the collet is released and plunger 32 is shifted inwardly to allow work support plunger 24 to retract. In order to insure that control plunger 32 has actually been retracted a switch 96 on slide 80 is adapted to be actuated by a collar 98 on rod 86. When switch 96 is actuated it transmits a signal to appropriate circuitry that allows the automatic transfer mechanism to continue cycling or energizes a light or other device that is designed to inform the operator that the collet has been released and the control plunger has been retracted. After the collet has been released and the control plunger retracted, slide 80 is retracted to the right and allows the work holding fixture 12 to be transferred from the work unloading station to a work loading station.

At the work loading station a mechanism is provided for properly setting the work support 10 so that the plunger 24 will be shifted vertically into work supporting relation with the workpiece and thereafter the collet sleeve 52 is actuated to the locked position. A mechanism for accomplishing these operations is illustrated in FIG. 5. The setting mechanism includes a base 100 on which is arranged a slide 102 adapted to be displaced toward and away from the fixture 12 by means of a cylinder 104. A hollow sleeve 106 is mounted on slide 102 for movement therewith. The outer end 108 of sleeve 106 is axially aligned with the outer end of collet actuating sleeve 66. Within sleeve 106 there is slideably arranged a rod 110, the outer end 112 is axially aligned with the outer end of plunger 32. When slide 102 is shifted to the left against a stop 114 the outer end of sleeve 106 engages and displaces collet actuating sleeve 66 inwardly to release the collet. When this occurs, plunger 32 is free to shift axially in a direction toward the right and thus elevate plunger 24 so that its upper end engages the workpiece as shown. Rod 110 is biased to the left by a light spring 116, the tension of which is readily overcome by the bias of spring 38. When rod 110 shifts in a direction to the right indicating that plunger 24 has been raised to work supporting engagement with the workpiece, a collar 118 on rod 110 actuates a switch 120 which, through appropriate circuitry, produces a signal indicating that the setting action of the support jack 10 has been properly performed. The signal produced by switch 120 serves the same purpose as the signal produced by switch 96. When slide 102 is retracted to the right by cylinder 104 springs 70 (FIG. 2) displace actuator sleeve 66 to the right and cause the collet fingers 56 to lock around control plunger 32 and, thus, prevent further axial movement of control plunger 32 in either direction.

I claim:

1. A work supporting jack comprising a body having a bore therein, a work supporting plunger axially slideable in said bore and projecting out of said body at one end thereof for supporting engagement with a workpiece, a second bore in said body intersecting the first bore, a control plunger slideable axially in said second bore, said control plunger having an axially inclined surface thereon engaged by the work support plunger such that axial movement of the control plunger in one direction causes the work support plunger to be displaced axially outwardly of said body at said one end thereof, a plunger clamping member mounted in said body in a position fixed axially relative to said second bore, said clamping member having at least a portion thereof movable radially of said second bore into frictional clamping engagement with said control plunger to lock the control plunger against axial movement, a clamp actuating member mounted in said body for movement in a direction parallel to the axis of the second bore and having a surface thereon engageable with the movable portion of said clamping member to displace said portion of the clamping member radially into locking engagement with the control plunger when the clamp actuating member is displaced axially in one direction.

2. A work supporting jack as called for in claim 1 including means biasing said clamp actuating member in said last-mentioned direction.

3. A work supporting jack as called for in claim 1 including means biasing said control plunger in a direction to displace said support plunger in a direction outwardly of the body.

4. A work supporting jack as called for in claim 1 wherein said interengaging surfaces of said actuating member and said clamping member are disposed in a wedge locking angle relationship.

5. A work supporting jack as called for in claim 1 wherein said movable portion of the clamping member is resiliently biased radially away from said control plunger.

6. A work supporting jack as called for in claim 1 wherein said clamp member comprises a collet sleeve extending circumferentially around the control plunger, said movable portion of said clamping member comprising a plurality of axially extending spring fingers on said collet sleeve.

7. A work supporting jack as called for in claim 6 wherein said spring fingers flex outwardly away from the control plunger when the clamp actuating member moves axially in a direction opposite to the locking direction thereof.

8. A work supporting jack as called for in claim 7 wherein said clamp actuating member comprises a sleeve surrounding said collet fingers.

9. A work supporting jack as called for in claim 8 wherein said control plunger and said collet actuating sleeve are biased axially in the same direction.

10. A work supporting jack as called for in claim 9 wherein the axes of the two bores are perpendicularly related.

11. A work supporting jack as called for in claim 9 wherein said collet actuating sleeve projects outwardly of said support at one end thereof and is adapted, when it is displaced inwardly of said body, to permit the collet fingers to flex radially out of locking engagement with the control plunger.

12. A work supporting jack as called for in claim 9 wherein said control plunger is biased axially in said one direction such that, when said collet actuating sleeve is displaced axially to release the collet sleeve, the control plunger is displaced by the biasing means acting thereon to shift the work support plunger in a direction outwardly of the body.

13. A work supporting jack as called for in claim 12 including means engageable with the outer end of the collet actuating sleeve to displace the same axially inwardly of said support to thereby release locking engagement between the control member and the collet sleeve.

14. A work supporting jack as called for in claim 12 including means engageable with the outer end of said collet actuating sleeve and the outer end of said control plunger for first displacing the collet actuating sleeve inwardly of said support to release the collet sleeve and to then displace the control plunger inwardly of said body to permit retraction of the support plunger inwardly of said body.

15. A work supporting jack as called for in claim 12 including a collet release member axially aligned with the outer end of said collet actuating sleeve, means for moving the release member axially to displace the collet actuating sleeve inwardly of said support and a plunger release member axially slideable on said collet release member, said plunger release member being adapted to engage the outer end of said control plunger and displace said control plunger inwardly of said body when the collet release member displaces the collet actuating member inwardly of said body.

16. A work supporting jack as called for in claim 15 wherein the control plunger is biased in a direction outwardly of the body and including means biasing the plunger release member for displacing the control plunger in a direction inwardly of said body, said last-mentioned biasing means being of sufficient strength to overcome the biasing means acting on the control plunger.

17. A work supporting jack as called for in claim 16 including means for producing a signal when the plunger release member displaces the control plunger axially inwardly of said body a predetermined distance.

18. A work supporting jack as called for in claim 15 wherein the control plunger is biased in a direction axially outwardly of said body and including means biasing the plunger release member for displacing the control plunger in a direction inwardly of said body, said last-mentioned biasing means being of less strength than the biasing means acting on the control plunger so that, when the control plunger is released by said collet release member, the control plunger is displaced axially outwardly of said body while the collet release member retains the collet actuating sleeve in an axially inwardly displaced position.

19. A work supporting jack as called for in claim 18 including means for producing a signal when the plunger release member has been displaced by the control plunger a predetermined distance in a direction away from said support.

* * * * *